United States Patent [19]
Baltz et al.

[11] Patent Number: 6,058,474
[45] Date of Patent: May 2, 2000

[54] METHOD AND APPARATUS FOR DMA BOOT LOADING A MICROPROCESSOR WITHOUT AN INTERNAL ROM

[75] Inventors: Philip K. Baltz; Natarajan Seshan, both of Houston; Ron A. Shipp, Austin, all of Tex.

[73] Assignee: Texas Instruments Incorporated, Dallas, Tex.

[21] Appl. No.: 09/012,332

[22] Filed: Jan. 23, 1998

Related U.S. Application Data

[60] Provisional application No. 60/036,396, Jan. 24, 1997.

[51] Int. Cl.$^7$ .................................................. G06F 9/445
[52] U.S. Cl. .................................................. 713/1; 710/22
[58] Field of Search .................................. 395/651, 180, 395/183.01, 652, 800; 364/200, 715.06, 578; 710/29, 28, 52, 23, 10, 20, 22, 33, 36; 371/21.1; 713/1, 2, 100; 709/212, 248

[56] References Cited

U.S. PATENT DOCUMENTS

| | | | |
|---|---|---|---|
| 4,371,929 | 2/1983 | Brann et al. | 364/200 |
| 4,912,636 | 3/1990 | Magar et al. | 364/500 |
| 5,072,418 | 12/1991 | Boutaud et al. | 364/715.06 |
| 5,321,819 | 6/1994 | Szczepanek | 395/325 |
| 5,329,417 | 7/1994 | Swoboda et al. | 364/578 |
| 5,359,468 | 10/1994 | Rhodes et al. | 360/53 |
| 5,446,741 | 8/1995 | Boldt et al. | 371/21.1 |
| 5,483,239 | 1/1996 | Arzynski et al. | 341/141 |
| 5,497,501 | 3/1996 | Kohzono et al. | 710/29 |
| 5,504,916 | 4/1996 | Murakami et al. | 712/1 |
| 5,561,821 | 10/1996 | Gephardt et al. | 710/28 |
| 5,652,789 | 7/1997 | Miner et al. | 379/201 |
| 5,682,552 | 10/1997 | Kuboki et al. | 710/52 |
| 5,765,025 | 6/1998 | Morimoto et al. | 710/23 |
| 5,802,382 | 9/1998 | Greenberger et al. | 395/800 |
| 5,815,706 | 9/1998 | Stewart et al. | 395/652 |
| 5,828,824 | 10/1998 | Swoboda | 395/183.01 |
| 5,832,194 | 11/1998 | Braun et al. | 395/180 |
| 6,006,266 | 12/1999 | Baker et al. | 710/22 |

*Primary Examiner*—Joseph E. Palys
*Assistant Examiner*—Rijue Mai
*Attorney, Agent, or Firm*—Gerald E. Laws; W. James Brady, III; Frederick J. Telecky, Jr.

[57] ABSTRACT

A microprocessor 10 has an internal program memory 23 and direct memory access (DMA) circuitry 100. Microprocessor 10 also has provisions for connecting to an external source of data via an external bus 73. Configuration circuitry 74 or 81 provides configuration parameters to DMA 100 when a reset signal 76 is deasserted. DMA 100 boot loads microprocessor 10 by transferring a block of data which contains an initial program from an external source to internal program memory after reset signal 76 is deasserted. At the completion of the boot load, microprocessor begins execution of the initial program.

23 Claims, 11 Drawing Sheets

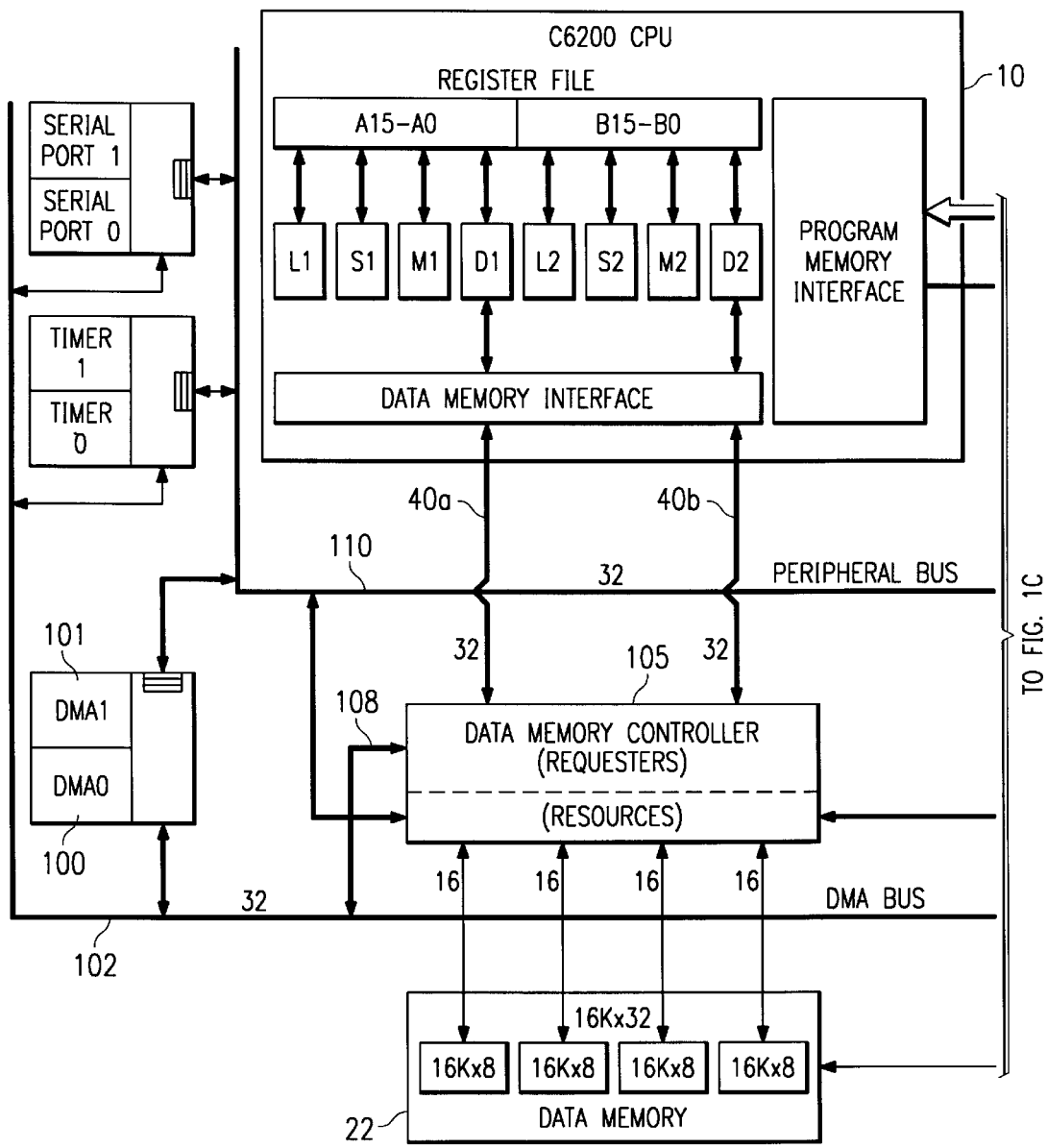
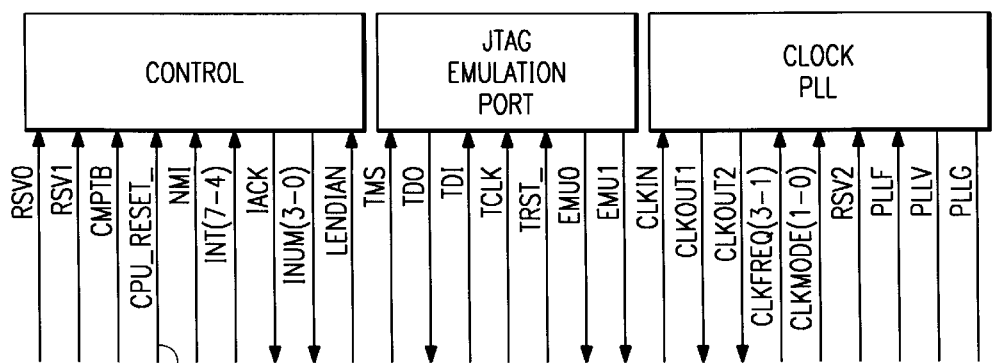
FIG. 1B

MEMORY MAP 0

| STARTING ADDRESS | | BLOCK SIZE (BYTES) |
|---|---|---|
| 000 0000 | EXTERNAL MEMORY SPACE CE0 | 16M |
| 100 0000 | EXTERNAL MEMORY SPACE CE1 | 4M |
| 140 0000 | INTERNAL PROGRAM RAM | 64K |
| 141 0000 | RESERVED | 4M |
| 180 0000 | INTERNAL PERIPHERAL SPACE | 4M |
| 1C0 0000 | RESERVED | 4M |
| 200 0000 | EXTERNAL MEMORY SPACE CE2 | 32M |
| 400 0000 | RESERVED | 1984M |
| 8000 0000 | INTERNAL DATA RAM | 64K |
| 8001 0000 | RESERVED | 4M |
| 8040 0000 | RESERVED | 2044M |
| 1 0000 0000 | | |

*FIG. 3A*

MEMORY MAP 1

| STARTING ADDRESS | | BLOCK SIZE (BYTES) |
|---|---|---|
| 000 0000 | INTERNAL PROGRAM RAM | 64K |
| 001 0000 | RESERVED | 4M |
| 040 0000 | EXTERNAL MEMORY SPACE CE0 | 16M |
| 140 0000 | EXTERNAL MEMORY SPACE CE1 | 4M |
| 180 0000 | SAME AS MEMORY MAP 0 | |
| 1 0000 0000 | | |

| BOOT_SRC | WORDS TRANSFERRED |
|---|---|
| 000b | NO DMA BOOT |
| 001b | DMA BOOT FROM EXTERNAL SPACE 1 |
| OTHER | RESERVED |

FIG. 6B

| BOOT_CNT | WORDS TRANSFERRED |
|---|---|
| 000b | 256 |
| 001b | 512 |
| 010b | 1024 |
| 011b | 2048 |
| 100b | 4096 |
| 101b | 8192 |
| 110b | 16384 |
| 111b | 32768 |

FIG. 6C

| CE1_WIDTH[1:0] | WIDTH OF MEMORY IN SPACE 1 |
|---|---|
| 00b | 8-BITS |
| 01b | 16-BITS |
| 10b | 32-BITS |
| 11b | RESERVED |

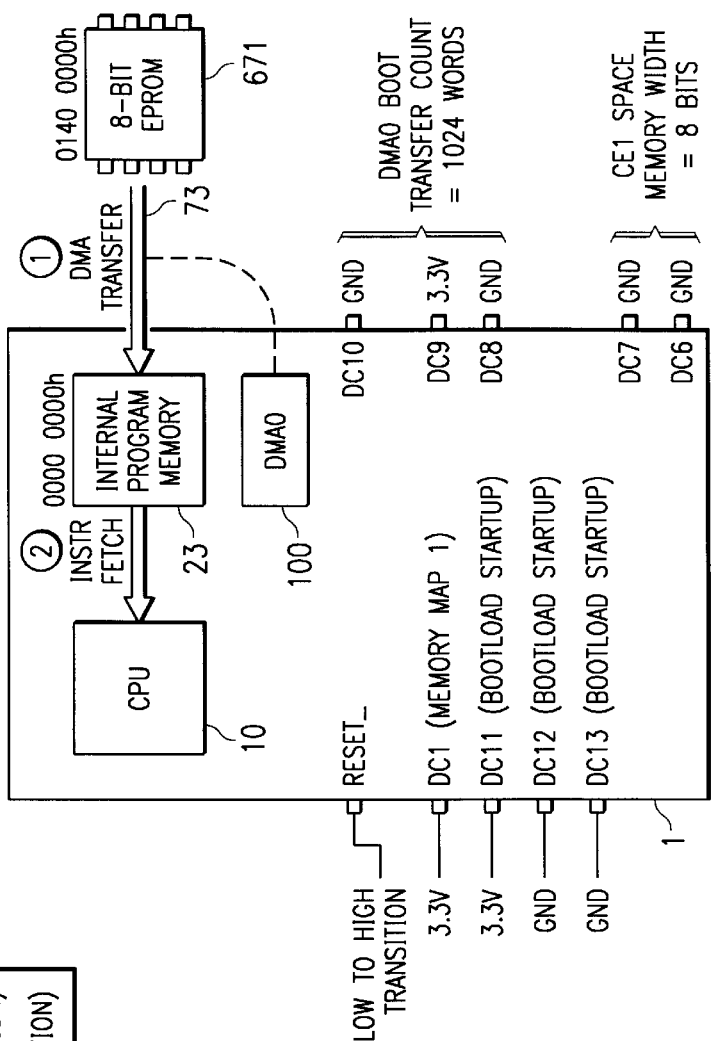
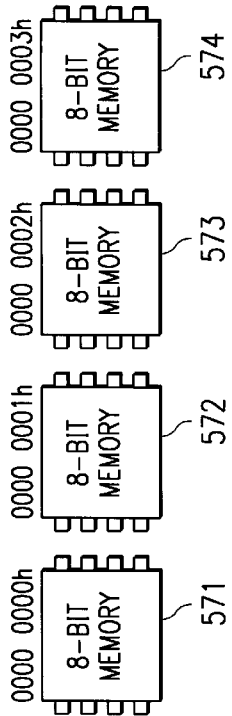
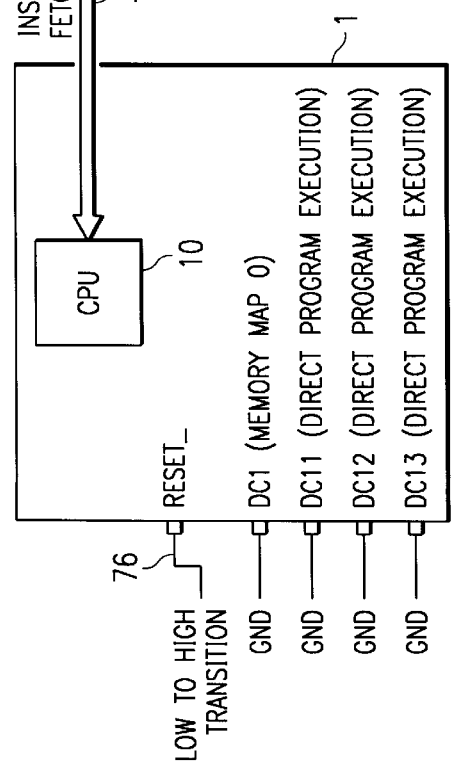

6,058,474

METHOD AND APPARATUS FOR DMA BOOT LOADING A MICROPROCESSOR WITHOUT AN INTERNAL ROM

CROSS REFERENCE TO RELATED APPLICATIONS

This application claims benefit of Provisional Application No. 60/036,396 filed Jan. 24, 1997.

This application is related to coassigned application Ser. No. 09/012,813 filed contemporaneously herewith and incorporated herein by reference.

TECHNICAL FIELD OF THE INVENTION

This invention relates to microprocessors, and particularly relates to microprocessors which include a direct memory access feature.

BACKGROUND OF THE INVENTION

Microprocessor designers have increasingly endeavored to improve performance in various microprocessors by increasing clock speeds and adding parallelism. Large blocks of random access memory (RAM) are included within the microprocessor for data storage and for program storage in order to reduce memory access times. When a microprocessor is first started after applying power or after being reset for various reasons, the microprocessor must be initialized and "boot loaded" with a program which can be executed. Typically, a microprocessor begins operation by executing a "bootstrap" program which is contained in a read only memory (ROM) or programmable read only memory (PROM) located within the microprocessor. The bootstrap program may provide initial operating parameters to the microprocessor and transfer a more sophisticated boot load program from an external source to the internal memory, or the bootstrap program may transfer an operating system program or an application program from an external source to the internal memory. Once a program is loaded in internal memory, then the microprocessor can execute this program.

Typically, the bootstrap ROM or PROM is used only when the microprocessor is initialized and booted. Unfortunately, the ROM/PROM takes a relatively large amount of space on the semiconductor substrate of the microprocessor.

An object of the present invention is to overcome the problem of allocating space on a microprocessor for ROM/PROM which is used only during a boot operation.

SUMMARY OF THE INVENTION

In general, and in a form of the present invention, a microprocessor which has a central processing unit (CPU) and an internal memory, is further equipped with direct memory access (DMA) circuitry which is operable to transfer data from an external source of data to the internal memory. DMA initialization circuitry that is active when a reset signal is asserted and is operable to cause the DMA circuitry to transfer data comprising a first program from a predetermined address in the external source. After the DMA transfer is complete, CPU control circuitry causes the CPU to start execution of the program at a predetermined location in the internal memory. Because of this novel program loading mechanism, a boot ROM is not required within the microprocessor.

In another form of the invention, the microprocessor has external interface pins connected to the DMA initialization circuitry for providing at least one configuration parameter to the DMA initialization circuitry. These pins may be dedicated to initializing the DMA circuitry, or they may be shared with other interface functions. A reset signal is used to indicate that the pins are to perform DMA initialization.

In another form of the present invention, a method for boot loading a microprocessor having a central processing unit (CPU) and an internal memory comprises the steps of initializing a direct memory access circuit when a reset signal transitions from an active state to an inactive state; transferring a first block of data which contains a program from an external ROM to the internal memory in the microprocessor under control of the direct memory access circuit; and executing the program after the step of transferring, so that a boot ROM is not required within the microprocessor.

Other embodiments of the present invention will be evident from the description and drawings.

BRIEF DESCRIPTION OF THE DRAWINGS

Other features and advantages of the present invention will become apparent by reference to the following detailed description when considered in conjunction with the accompanying drawings, in which:

FIGS. 1B–1C are a more detailed block diagram of the microprocessor of FIG. 1A;

FIGS. 3A and 3B illustrate two address maps used by the microprocessor of FIG. 1A;

FIGS. 6A–C are charts which describe the interface pins for initializing the DMA controllers of FIGS. 4A–4B and 5A–5B;

FIG. 7 is a block diagram showing the microprocessor of FIGS. 5A–5B configured to begin execution from external memory; and FIG. 8 is a block diagram showing the microprocessor of FIGS. 5A–5B configured to perform a boot load according to the present invention.

Corresponding numerals and symbols in the different figures and tables refer to corresponding parts unless otherwise indicated.

DETAILED DESCRIPTION OF EMBODIMENTS OF THE INVENTION

Figure 1A:
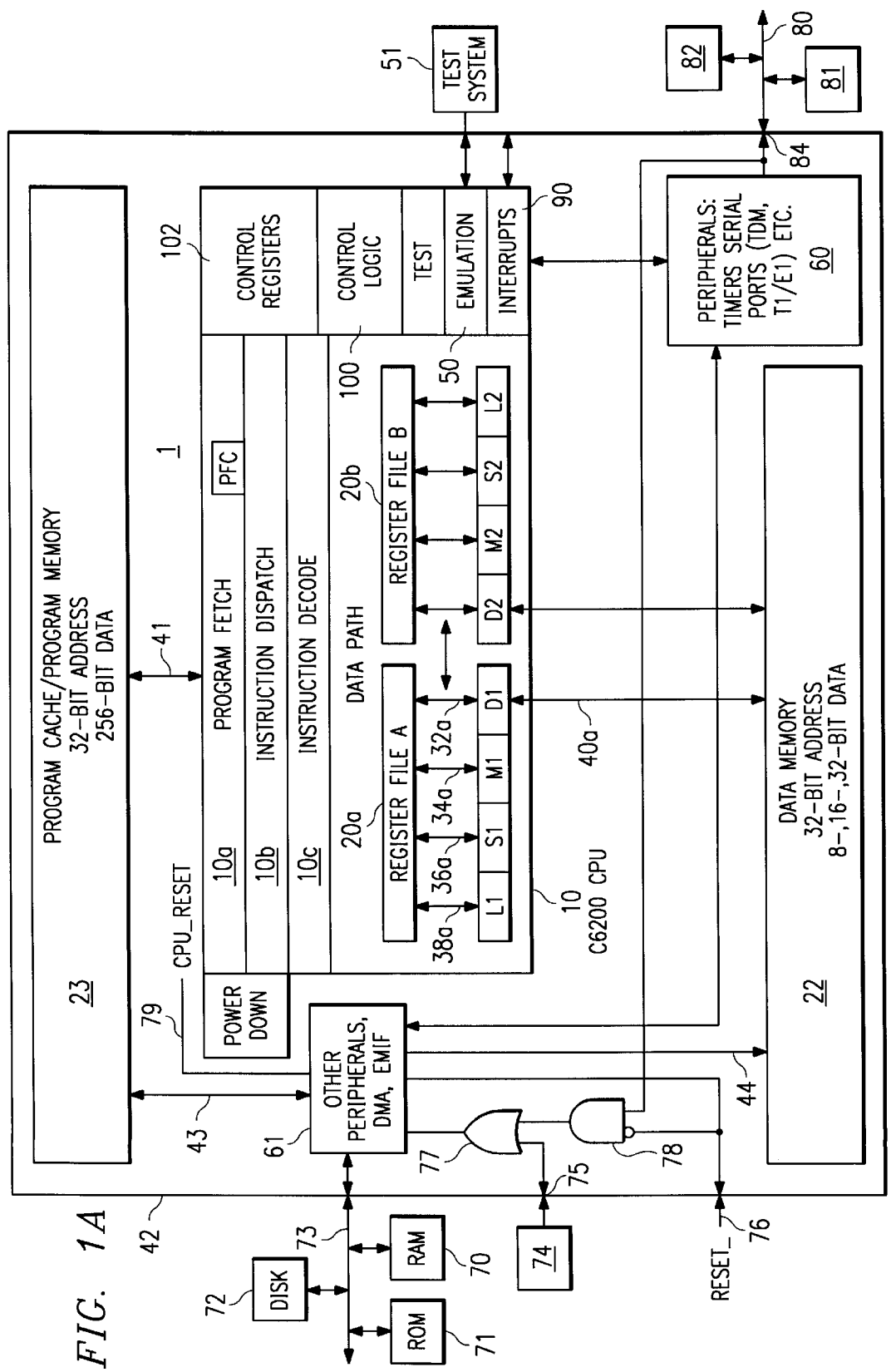
FIG. 1A is a block diagram of a microprocessor which has an embodiment of the present invention.

FIG. 1A is a block diagram of a microprocessor 1 which has an embodiment of the present invention. Microprocessor 1 is a VLIW digital signal processor ("DSP"). In the interest of clarity, FIG. 1 only shows those portions of microprocessor 1 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 1 relevant to an embodiment of the present invention are explained in sufficient detail hereinbelow, so as to enable one of ordinary skill in the microprocessor art to make and use the invention.

In microprocessor 1 there are shown a central processing unit (CPU) 10, data memory 22, program memory 23, peripherals 60 and an external memory interface (EMIF) with a direct memory access (DMA) 61. CPU 10 further has an instruction fetch/decode unit 10a–c, a plurality of execution units, including an arithmetic and load/store unit D1, a multiplier M1, an ALU/shifter unit S1, an arithmetic logic unit ("ALU") L1, a shared multiport register file 20a from which data are read and to which data are written. Decoded instructions are provided from the instruction fetch/decode unit 10a–c to the functional units D1, M1, S1, and L1 over various sets of control lines which are not shown. Data are provided to/from the register file 20a from/to to load/store units D1 over a first set of busses 32a, to multiplier M1 over a second set of busses 34a, to ALU/shifter unit S1 over a third set of busses 36a and to ALU L1 over a fourth set of busses 38a. Data are provided to/from the memory 22 from/to the load/store units D1 via a fifth set of busses 40a. Note that the entire data path described above is duplicated with register file 20b and execution units D2, M2, S2, and L2. Instructions are fetched by fetch unit 10a from instruction memory 23 over a set of busses 41. Emulation unit 50 provides access to the internal operation of integrated circuit 1 which can be controlled by an external test system 51.

Figure 1C:
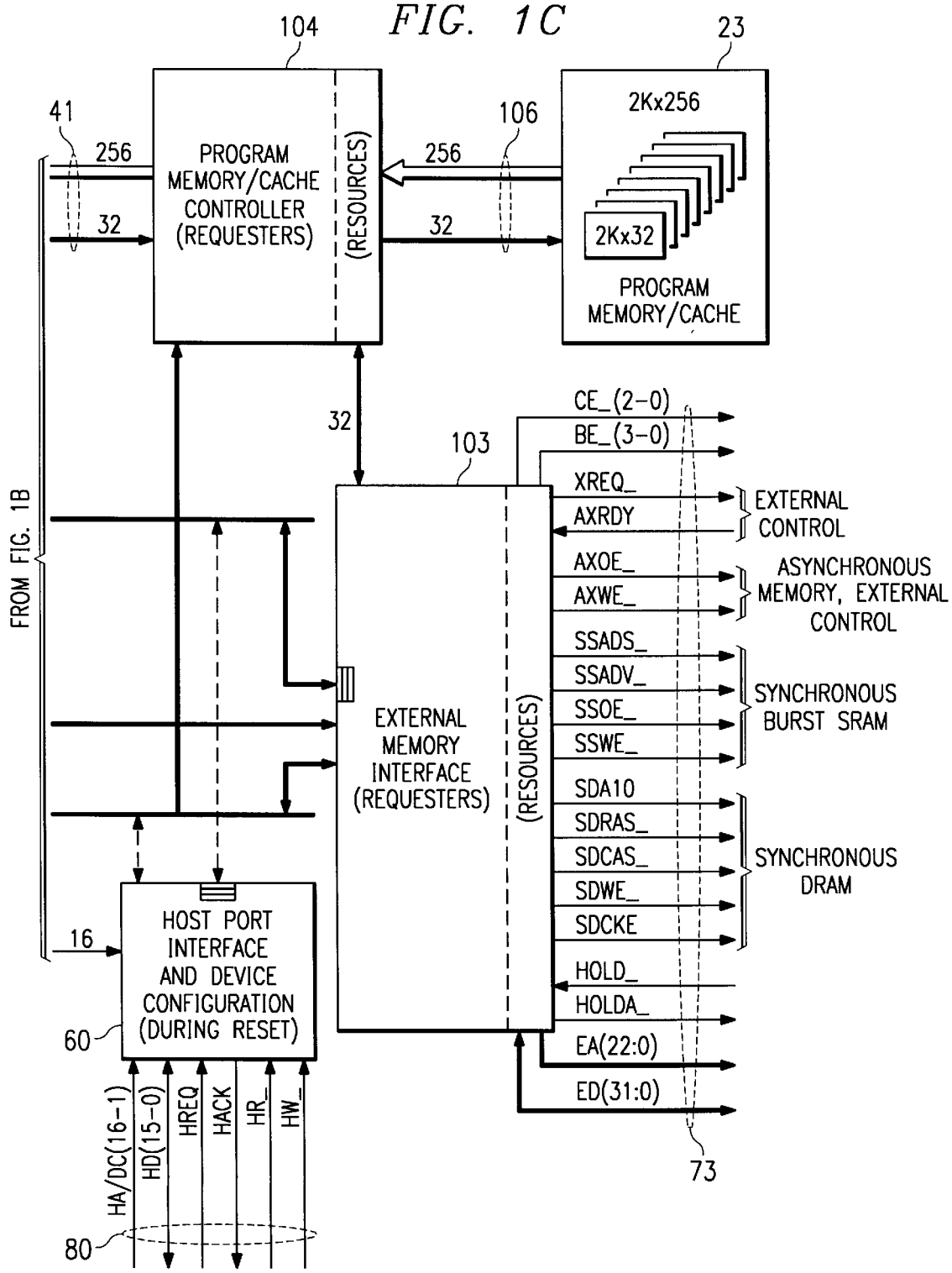

Note that the memory 22 and memory 23 are shown in FIG. 1 to be a part of a microprocessor 1 integrated circuit, the extent of which is represented by the box 42. The memories 22–23 could just as well be external to the microprocessor 1 integrated circuit 42, or part of it could reside on the integrated circuit 42 and part of it be external to the integrated circuit 42. Also, an alternate number of execution units can be used.

When microprocessor 1 is incorporated in a data processing system, additional memory or peripherals may be connected to microprocessor 1, as illustrated in FIG. 1. For example, Random Access Memory (RAM) 70, a Read Only Memory (ROM) 71 and a Disk 72 are shown connected via an external bus 73. Bus 73 is connected to an External Memory Interface (EMIF) which is part of functional block 61 within microprocessor 42. A Direct Memory Access (DMA) controller is also included within block 61. The DMA controller is generally used to move data between memory and peripherals within microprocessor 1 and memory and peripherals which are external to microprocessor 1. Data can be transferred from block 61 to program memory 23 via bus 43; data can be transferred to/from data memory 22 via bus 44. Other types of peripherals, such as timer 82, are connected via host port bus 80. A bus interface is contained within block 60 for host port bus 80.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features of the microprocessor of FIG. 1A is provided in coassigned application Ser. No. 09/012,813. A description of a complete set of instructions for the microprocessor of FIG. 1 is also provided in coassigned application Ser. No. 09/012,813.

According to the present invention, the DMA controller in block 61 can be used to transfer a block of data from an external source to internal program memory 23 in response to reset signal 76. This block of data contains an initial program that can be executed by microprocessor 1 and may be a boot strap loader. A boot strap loader is used to load in a larger program for microprocessor 1. In either case, microprocessor 1 becomes operational without the need for a boot PROM or ROM within the microprocessor. This is advantageous because a PROM/ROM is relatively large and is typically used only for booting. Therefore, the space saved within microprocessor 1 by eliminating the need for a boot PROM/ROM can be advantageously used for more useful functions or the size of microprocessor 1 can be reduced in order to make a lower cost device.

Configuration circuitry 74 provides configuration parameters via interface pins 75 to block 61 for use in initializing the DMA controller. In an alternative embodiment, configuration circuitry 81 provides configuration parameters over bus 80 via interface pins 84 to block 61 for use in initializing the DMA controller. Block 77 provides an "OR" function so that configuration parameters from either circuitry 74 or 81 can be passed to block 61.

FIG. 1B is a more detailed block diagram of the microprocessor of FIG. 1A. Two DMA controllers are provided in block 61 for two separate DMA channels, DMA0 100 and DMA1 101. In the present embodiment, only DMA0 100 is configured to provide boot loading according to an aspect of the present invention, but this should not be considered a limiting constraint on the present invention. DMA controllers 100 and 101 are configured under program control by means of peripheral bus 110, which is connected via data bus 40b to CPU 10. DMA0 100 is operable to transfer data from an external source, such as ROM 71 in FIG. 1A to program memory 23 or data memory 22.

According to an aspect of the present invention, DMA0 100 is initialized to perform a boot load when reset signal 76 transitions from an asserted state to a deasserted state. Details of this initialization will be described later. After this initialization step, DMA0 100 begins requesting memory transfers. External memory interface (EMIF) 103 responds to a memory request from DMA0 100 via bus 102 and accesses data from a source on bus 73. After a data word is provided by EMIF 103, DMA0 100 transfers the data word to program memory controller 104 which then writes the data word into program memory 23 via bus 106 at an address designated by DMA0 100. During this boot load process, CPU_Reset_signal 79 is held in an asserted state by DMA0 100 so that no instruction processing is performed by CPU 10.

Figure 2:
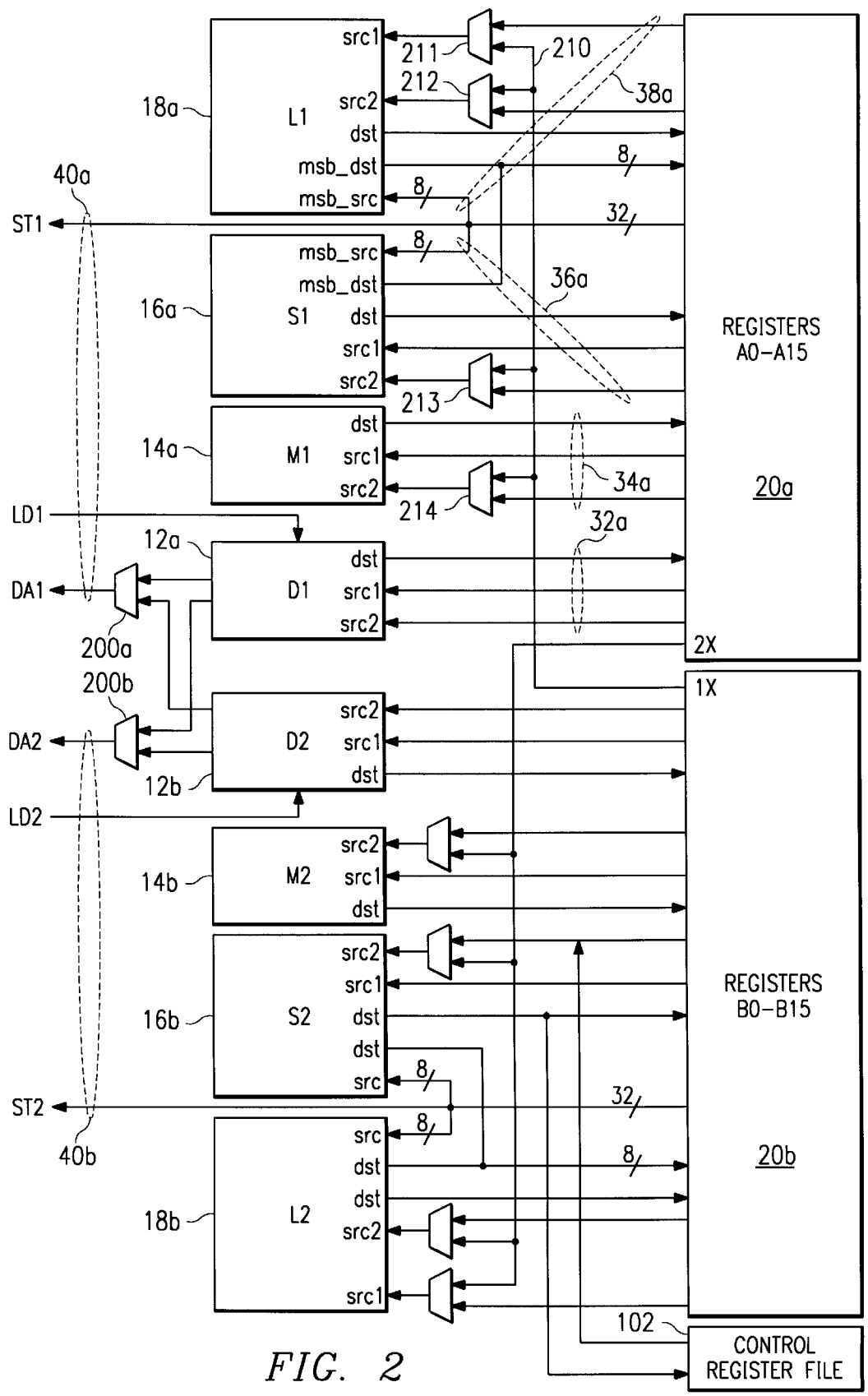
FIG. 2 is a block diagram of the execution units and register files of the microprocessor of FIG. 1.

FIG. 2 is a block diagram of the execution units and register files of the microprocessor of FIG. 1A and shows a more detailed view of the buses connecting the various functional blocks. In this figure, all data busses are 32 bits wide, unless otherwise noted. Bus 40a has an address bus DA1 which is driven by mux 200a. This allows an address generated by either load/store unit D1 or D2 to provide an address for loads or stores for register file 20a. Data Bus LD1 loads data from an address in memory 22 specified by address bus DA1 to a register in load unit D1. Unit D1 may manipulate the data provided prior to storing it in register file 20a. Likewise, data bus ST1 stores data from register file 20a to memory 22. Load/store unit D1 performs the following operations: 32-bit add, subtract, linear and circular address calculations. Load/store unit D2 operates similarly to unit D1, with the assistance of mux 200b for selecting an address.

ALU unit L1 performs the following types of operations: 32/40 bit arithmetic and compare operations; left most 1, 0, bit counting for 32 bits; normalization count for 32 and 40 bits; and logical operations. ALU L1 has input src1 for a 32 bit source operand and input src2 for a second 32 bit source operand. Input msb_src is an 8 bit value used to form 40 bit source operands. ALU L1 has an output dst for a 32 bit destination operands. Output msb_dst is an 8 bit value used to form 40 bit destination operands. Two 32 bit registers in register file 20a are concatenated to hold a 40 bit operand. Mux 211 is connected to input src1 and allows a 32 bit operand to be obtained from register file 20a via bus 38a or from register file 20b via bus 210. Mux 212 is connected to input src2 and allows a 32 bit operand to be obtained from register file 20a via bus 38a or from register file 20b via bus 210. ALU unit L2 operates similarly to unit L1.

ALU/shifter unit S1 performs the following types of operations: 32 bit arithmetic operations; 32/40 bit shifts and 32 bit bit-field operations; 32 bit logical operations; branching; and constant generation. ALU S1 has input src1 for a 32 bit source operand and input src2 for a second 32 bit source operand. Input msb_src is an 8 bit value used to form 40 bit source operands. ALU S1 has an output dst for a 32 bit destination operands. Output msb_dst is an 8 bit value used to form 40 bit destination operands. Mux 213 is connected to input src2 and allows a 32 bit operand to be obtained from register file 20a via bus 36a or from register file 20b via bus 210. ALU unit S2 operates similarly to unit S1, but can additionally perform register transfers to/from the control register file 102.

Multiplier M1 performs 16×16 multiplies. Multiplier M1 has input src1 for a 32 bit source operand and input src2 for a 32 bit source operand. ALU S1 has an output dst for a 32 bit destination operands. Mux 214 is connected to input src2 and allows a 32 bit operand to be obtained from register file 20a via bus 34a or from register file 20b via bus 210. Multiplier M2 operates similarly to multiplier M1.

FIG. 3A and 3B shows two memory maps for the microprocessor of FIG. 1A. The memory is byte addressable and it's total address range is 4G bytes (corresponding to a 32-bit internal address). The memory map is divided between the internal program memory 23, internal data memory 22 and three external memory spaces and internal peripheral space. A section of internal memory can be accessed by the host port interface (HPI) 60.

The internal memory consists of 512k bits of on-chip program/cache memory 23 and 512k bits of on-chip data memory 22. The program memory, configurable as cache or program, is organized in 2k of 256-bit instruction fetch packets. The CPU 10 fetches all instructions one fetch packet at a time. The packets are processed at the maximum rate of eight 32-bit instructions per CPU cycle or at a minimum of one instruction per cycle. The internal data memory is byte addressable by the CPU (for reads as well as writes) and supports byte, half-word and full word transfers.

All external data accesses by CPU 10 or DMA 100 pass through the external memory interface (EMIF) 103. The external memory is divided into 3 spaces—CE0, CE1 and CE2. Each has a dedicated chip enable signal that is asserted during data access to or from the corresponding space. Each external space has assigned a separate internal peripheral bus register that determines the shape of the read/write cycle when accessing asynchronous memory.

In addition to asynchronous memory, CE0 and CE2 spaces can also interface to other types of memory. SBSRAM or SDRAM memory can be assigned to those two spaces by controlling signal levels on signal groups CE0_TYPE and CE2_TYPE (pins DC2–DC5) during Reset.

External memory space CE1 can only interface to asynchronous memory. However, while spaces CE0 and CE2 are always 32-bit wide, the CE1 memory space can also be configured to the width of 8 or 16 bits by controlling signal levels on signal group CE1_WIDTH pins 208–209 of FIG. 4. FIG. 6C illustrates the encoding of CE1_width bits. The EMIF automatically packs bytes and half-words into words during read cycles—a feature typically used when booting from an 8- or 16-bit EPROM. The CE1 memory space can be used for ROM interfacing because ROM cycles are similar to asynchronous SRAM read cycles. Note, that while the CE1 space is the only external memory space that allows read cycles from 8- or 16-bit wide memory, read cycles from any external memory space can access byte or half-word sized data from 32-bit wide external memory. The EMIF data write cycles can transfer bytes, half-words or words to external memory as well, using BE_ control signals for byte selects. Data read cycles always latch all 4 bytes (all 4 BE_'s active) and the CPU then extracts the appropriate bytes internally if the data size is less then 32 bits. Note, that EMIF writes requested by the program memory controller 104 or the DMA 100/101, are always 32-bits wide, as opposed to 8-, 16-, or 32-bit transfers originated by the data memory controller 105.

Figure 4A:
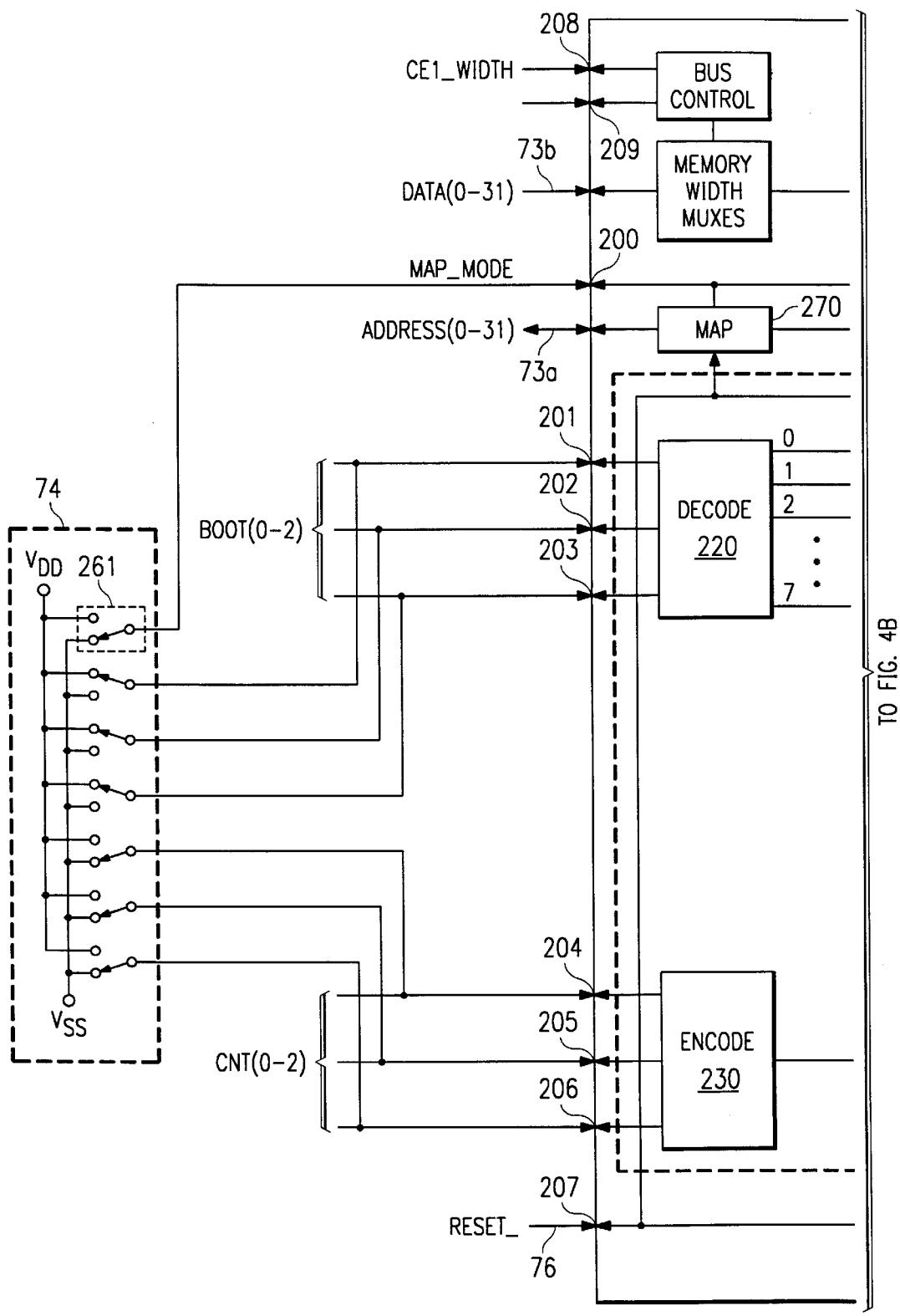
FIGS. 4A–4B are a block diagram of a DMA controller included in the microprocessor of FIG. 1 which has bootstrap initialization apparatus, according to the present invention.

The state of a map_mode pin 200 in FIG. 4A when reset signal 76 transitions selects memory map 0 or memory map 1, which determines whether the internal program RAM 23 is placed in the memory map before or after the external memory spaces CE0 and CE1. The type of memory map mode chosen would typically depend on the startup procedure used following the device power-up, which will be discussed later.

Figure 4B:
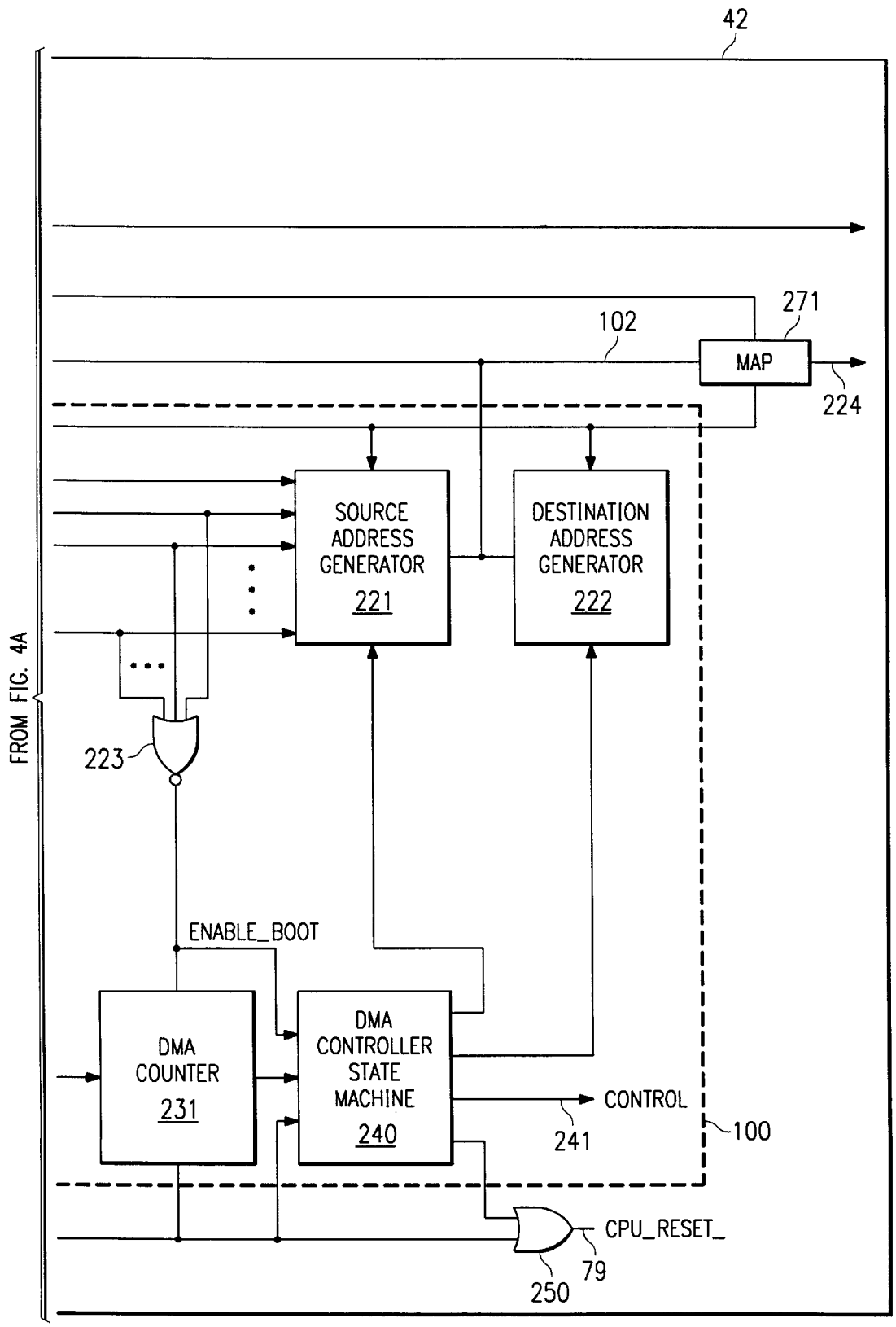

FIGS. 4A–4B are a block diagram of a DMA controller 200 included in the microprocessor of FIG. 1A which has boot-strap initialization apparatus, according to the present invention. The general operation of a DMA control unit is well known and won't be described in detail herein. Source address generator 221 provides a source address which specifies where data is accessed from. Destination address generator 222 provides a destination address which specifies where data is written during a DMA transfer. Initialization circuitry 220 responds to configuration parameter signals on external pins 201–203 which define what source is to be used during a boot operation. FIG. 6A is a chart which illustrates an encoding for this purpose. If a "000" is selected, no boot is performed by DMA0 100. If a "001" is selected, a boot from an external source beginning at address "0140 0000" is performed.

Map-mode pin 200 selects one of two address maps for arranging internal and external memory addressing. FIG. 3A illustrates an address map that is selected when map_mode 200 is logic 0, while FIG. 3B illustrates an address map that is selected when map mode 200 is logic 1. The address map of FIG. 3B is selected for DMA booting. Source address generator 221 is loaded with "0140 0000" when reset signal 76 transitions so that external memory requests are formed after passing through map circuitry 270, located in EMIF 103. DMA state machine 240 also responds to the code selection on pins 201–203.

The amount of data to be transferred during a boot operation is specified by configuration parameters on external pins 204–206. FIG. 6B is a chart which illustrates a boot_cnt encoding for this purpose that corresponds to $2^{(8+boot\_cnt)}$. By this method, a block of data ranging from 256 words to 32,768 words can be transferred. The boot_cnt code specified by pins 204–206 is decoded by initialization circuitry 230 and loaded into counter 231 when reset signal 76 transitions.

Destination address generator is set to start at address "0" when reset signal 76 transitions so that write cycles to internal program memory 23 are formed after passing through map circuitry 271. Map circuitry 271 is located within program memory controller 104.

Once the entire data block has been transferred, DMA state machine deasserts cpu_reset_signal 79 which allows CPU 10 to begin processing instructions beginning at address "0." When address map mode 1 of FIG. 3B is selected, instruction execution begins in internal program memory 23 which was loaded by the DMA boot operation.

In FIGS. 4A & 4B, dedicated external pins 200–206 are used to provide configuration parameters for the DMA boot operation to initialization circuitry 220 and 230. Configuration circuitry 74 provides terminals which are connected to a logic 1 and other terminals which are connected to a logic 0 so that pins 200–206 can be strapped to one or the other logic state.

Figure 5A:
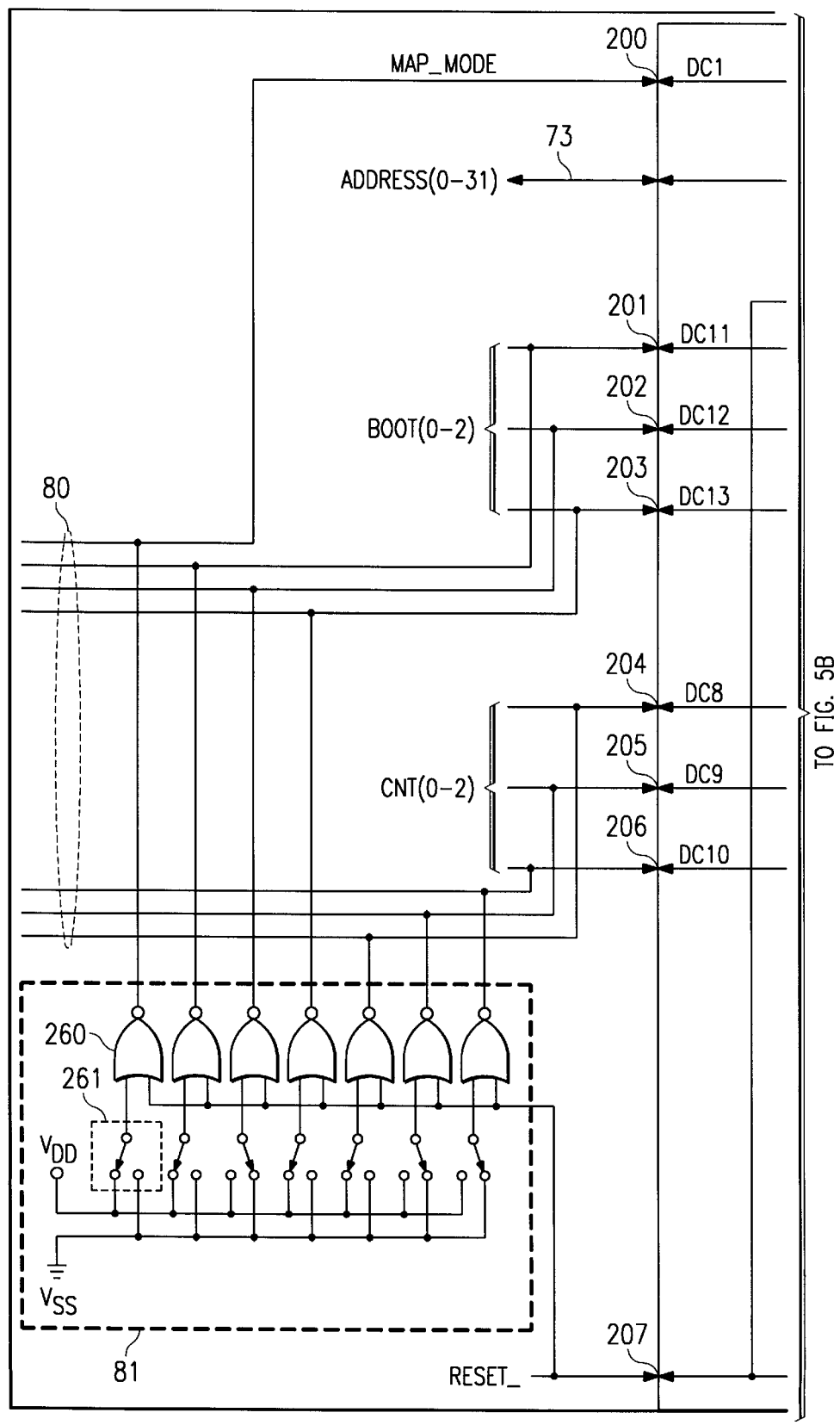
FIGS. 5A–5B are a block diagram of the DMA controller of FIG. 4 with a different initialization apparatus.
Figure 5B:
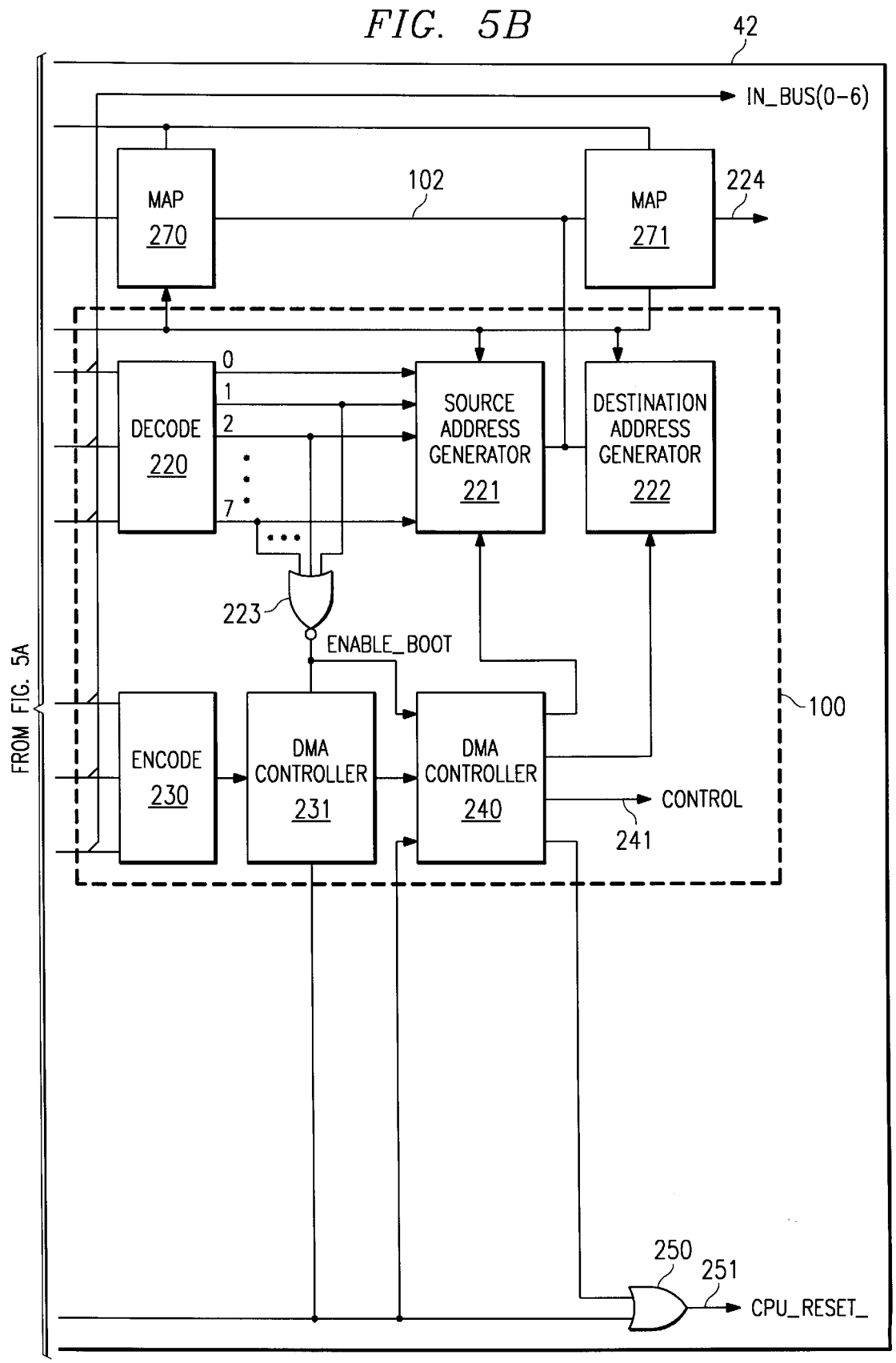

In FIGS. 5A & 5B, DMA0 100 receives configuration parameters from external pins 200–206 which are shared with host port interface 60 as pins DC1, DC8–DC13. Configuration circuitry 81 uses gates such as open collector OR gate 260 to disable configuration parameters when signal reset_ 76 is deasserted (logical 1).

FIG. 7 is a block diagram showing the microprocessor of FIGS. 5A–5B configured to begin execution from external memory. Note that FIG. 7 is also applicable to FIGS. 4A–4B when dedicated external pins are used for configuration parameters. Pin DC 1 selects memory map 0, and pins DC11–13 select no DMA boot operation. Therefore, CPU 10 begins program execution after reset signal 76 is deasserted by executing out of external memories 571–574, which form 32 bit words.

FIG. 8 is a block diagram showing the microprocessor of FIG. 5 configured to perform a boot load according to the present invention. Note that FIG. 8 is also applicable to FIG. 4 when dedicated external pins are used for configuration parameters. Pin DC 1 selects memory map 1, and pins DC11–13 select a DMA boot operation. Pins DC8–DC10 provide a configuration parameter which specifies a DMA block of 1024 words. Pins DC6–DC7 specify a CE1 width of 8 bits. Therefore, DMA0 100 transfers 1024 32-bit words of data from external 8-bit ROM 671, beginning at address "0140 0000," to internal program memory 23. After the DMA boot load is complete, cpu_reset_signal 79 is deasserted and CPU 10 begins program execution by executing out of internal program memory 23, beginning at address "0.".

An alternative embodiment of the novel aspects of the present invention may include other functional circuitries which are combined with the functional circuitries disclosed herein in order to reduce the total gate count of the combined functions. Since those skilled in the art are aware of techniques for gate minimization, the details of such an embodiment will not be described herein.

Another alternative embodiment of a novel aspect of the present invention provides configuration parameters to the initialization circuitry 220 and 230 by directly connecting inputs of circuitry 220 and 230 to predetermined logic levels. In this case, a DMA boot operation is performed, but the parameters are not user changeable. In another embodiment, the predetermined logic levels are mask programmable.

Another embodiment of a novel aspect of the present invention provides configuration parameters to the initialization circuitry 220 and 230 by directly connecting inputs of circuitry 220 and 230 to an electrically alterable ROM or PROM that is programmable by a user. In another embodiment, the electrically alterable ROM can be written to by CPU 10.

Another embodiment of a novel aspect of the present invention uses an address map which is different from FIGS. 3A–3B. Internal and external memory addresses which are different are comprehended by modifications to initialization circuitry 220 and 230.

Another embodiment of the present invention has more or less bits provided for various configuration parameters.

An advantage of the present invention is that a microprocessor can be boot loaded from and external source without the need to have a boot ROM within the microprocessor. Considerable space within such a microprocessor can by saved thereby and used for other purposes for improving performance of the microprocessor.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A microprocessor having a central processing unit (CPU) and an internal memory, further comprising.
    a direct memory (DMA) circuitry operable to transfer data from an external source to said internal memory;
    DMA initialization circuitry responsive to reset signal and operable to cause said DMA circuitry to transfer data comprising a first program having a predetermined size from a predetermined address in said external source in response to said reset signal transitioning from a reset state to a deasserted state; and
    CPU control circuitry openable to cause said CPU to start execution of said first program at a predetermined location in said internal memory after said first program is transferred, whereby a boot ROM is not required within said microprocessor.

2. The microprocessor of claim 1, further comprising at least one interface pin on said microprocessor connected to said DMA initialization circuitry for receiving at least one configuration parameter from external configuration circuitry for providing to said DMA initialization circuitry.

3. The microprocessor of claim 2, wherein said at least one interface pin is operable to provide said configuration parameter when said reset signal is in a first logic state, and to perform a different function when said reset signal is in a second logic state.

4. The microprocessor of claim 2, wherein said first program is a bootstrap program.

5. The microprocessor of claim 1, further comprising parameter circuitry directly connected to said DMA initialization circuitry for providing at least one configuration parameter to said DMA initialization circuitry, wherein at least a first one of said at least one configuration parameter cannot be modified by said microprocessor.

6. The microprocessor of claim 1, further comprising reset circuitry connected between the reset signal and the CPU and responsive to the DMA circuitry, operable to maintain said microprocessor in a reset state until said DMA circuitry completes transferring said first program.

7. The microprocessor of claim 1 further comprising configuration circuitry connected to said initialization circuitry operable to provide at least a first configuration parameter to said initialization circuitry, wherein said first configuration parameter specifies said predetermined size of said first program.

8. The microprocessor of claim 7, wherein a second configuration parameter provided by said configuration circuitry specifies said first predetermined address.

9. A method for boot loading a microprocessor having a central processing unit (CPU) and an internal memory, said method comprising:
 initializing a direct memory access circuit to a preselected source address, destination address, and word count when a reset signal transitions from an active state to an inactive state;
 transferring first data comprising a first program having said word count from an external source at said source address to said internal memory at said destination address in said microprocessor under control of said direct memory access circuit;
 maintaining said microprocessor in a reset state until said step of transferring is complete; and
 executing said first program after said step of transferring, whereby a boot ROM is not required within said microprocessor.

10. The method of claim 9, wherein the step of initializing further comprising configuring said direct memory access circuit by inputting at least one configuration parameter to said direct memory access circuit via at least one interface pin on said microprocessor.

11. The method of claim 10, further comprising using said at least one interface pin for a different function after said step of initializing.

12. The method of claim 6, wherein said first program is a boot program and further comprising:
 transferring second data comprising a second program from an external source to said internal memory under control of said boot strap program; and
 executing said second program after said step of transferring second data.

13. A signal processing system, comprising:
 sensor means for producing a digital signal in response to a physical input representative of a pattern;
 a microprocessor having a central processing unit (CPU) and an internal program memory holding instructions for execution by said CPU to recognize the pattern;
 said microprocessor further comprising:
  a direct memory access (DMA) circuitry operable to transfer data from an external source to said internal memory;
  DMA initialization circuitry responsive to a reset signal and operable to cause said DMA circuitry to transfer data comprising a first program having a predetermined size from a predetermined address in said external source in response to said reset signal transitioning from a reset state to a deasserted state; and
  CPU control circuitry operable to cause said CPU to start execution of said first program at a predetermined location in said internal memory after said first program is transferred, whereby a boot ROM is not required within said microprocessor.

14. The signal processing system of claim 13 wherein said sensor means includes a microphone and an analog-to-digital converter and said program memory holds instructions for a speech recognition process.

15. A microprocessor having a central processing unit (CPU) and an internal memory, further comprising:
 a direct memory access (DMA) circuitry operable to transfer data from an external source to said internal memory, said DMA circuitry responsive to a reset signal and a first control signal and operable to cause said DMA circuitry to transfer data comprising a first program having a predetermined size from a predetermined address in said external source if said first control signal is in a first state in response to said reset signal transitioning from a reset state to a deasserted state; and
 CPU control circuitry operable to cause said CPU to start execution of said first program at a predetermined location in said internal memory after said first program is transferred if said first control signal is in said first state, CPU control circuitry further operable to cause said CPU to start execution of a second program at a pro-selected address if said first control signal is in a second state, whereby a boot ROM is not required within said microprocessor.

16. The microprocessor of claim 15, further comprising at least one interface pin on said microprocessor connected to said DMA initialization circuitry for receiving at least one configuration parameter from external configuration circuitry for providing to said DMA initialization circuitry.

17. The microprocessor of claim 16, wherein said at least one interface pin is operable to provide said configuration parameter when said reset signal is in a first logic state, and to perform a different function when said reset signal is in a second logic state.

18. The microprocessor of claim 16, wherein said first program is a bootstrap program.

19. A microprocessor having a central processing unit (CPU) and an internal memory, further comprising:
 a direct memory access (DMA) circuitry operable to transfer data from an external source to said internal memory;
 DMA initialization circuitry responsive to a reset signal and operable to cause said DMA circuitry to transfer data comprising a first program having a predetermined size from a predetermined address in said external source in response to said reset signal transitioning from a reset state to a deasserted state;
 parameter circuitry directly connected to said DMA initialization circuitry for providing at least one configuration parameter to said DMA initialization circuitry, wherein at least a first one of said at least one configuration parameter cannot be modified by said microprocessor; and
 CPU control circuitry operable to cause said CPU to start execution of said first program at a predetermined location in said internal memory after said first program is transferred, whereby a boot ROM is not required within said microprocessor.

20. The microprocessor of claim 19, further comprising reset circuitry connected between the reset signal and the CPU and responsive to the DMA circuitry, operable to maintain said microprocessor in a reset state until said DMA circuitry completes transferring said first program.

21. The microprocessor of claim 19, further comprising at least one interface pin on said microprocessor connected to said DMA initialization circuitry for receiving at least one configuration parameter from external configuration circuitry for providing to said DMA initialization circuitry.

22. The microprocessor of claim 21, wherein said at least one interface pin is operable to provide said configuration parameter when said reset signal is in a first logic state, and to perform a different function when said reset signal is in a second logic state.

23. The microprocessor of claim 19, wherein said first program is a bootstrap program.

* * * * *